US008815371B2

(12) United States Patent
Arrell et al.

(10) Patent No.: US 8,815,371 B2
(45) Date of Patent: Aug. 26, 2014

(54) STRUCTURE AND METHOD FOR FORMING DETAILED CHANNELS FOR THIN WALLED COMPONENTS USING THERMAL SPRAYING

(75) Inventors: Douglas J. Arrell, Oviedo, FL (US);
Allister W. James, Orlando, FL (US);
Anand A. Kulkarni, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 895 days.

(21) Appl. No.: 12/420,135

(22) Filed: Apr. 8, 2009

(65) Prior Publication Data
US 2010/0075111 A1    Mar. 25, 2010

Related U.S. Application Data

(60) Provisional application No. 61/098,993, filed on Sep. 22, 2008.

(51) Int. Cl.
| | | |
|---|---|---|
| *B32B 3/00* | (2006.01) | |
| *B32B 3/20* | (2006.01) | |
| *F01D 5/08* | (2006.01) | |
| *F01D 5/20* | (2006.01) | |
| *F01D 5/28* | (2006.01) | |
| *C23C 4/18* | (2006.01) | |
| *B23P 15/00* | (2006.01) | |
| *C23C 4/08* | (2006.01) | |
| *F01D 5/18* | (2006.01) | |
| *B23P 15/04* | (2006.01) | |
| *F01D 25/12* | (2006.01) | |
| *C23C 4/06* | (2006.01) | |
| *F02C 7/12* | (2006.01) | |

(52) U.S. Cl.
CPC ... *F01D 5/18* (2013.01); *F01D 5/288* (2013.01); *C23C 4/185* (2013.01); *F05D 2230/90* (2013.01); *B23P 15/00* (2013.01); *B23P 2700/06* (2013.01); *C23C 4/085* (2013.01); *F05D 2300/21* (2013.01); *B23P 15/04* (2013.01); *F01D 25/12* (2013.01); *C23C 4/06* (2013.01); *F02C 7/12* (2013.01); *B23P 2700/13* (2013.01)
USPC .......... 428/172; 428/188; 415/115; 415/116; 416/95; 416/97 R; 416/232; 416/241 B

(58) Field of Classification Search
USPC .......... 428/167, 172, 188; 415/115, 116, 200; 416/95, 232, 241 B, 97 R
See application file for complete search history.

(56) References Cited

U.S. PATENT DOCUMENTS

| | | |
|---|---|---|
| 5,075,966 A | 12/1991 | Mantkowski |
| 5,875,549 A | 3/1999 | McKinley |
| 6,209,199 B1 | 4/2001 | Cornu et al. |
| 6,321,449 B2 | 11/2001 | Zhao et al. |

(Continued)

*Primary Examiner* — Donald J Loney

(57) ABSTRACT

A coated substrate with a subsurface cooling channel having no corner disposed proximate a seam between the substrate and the coating. A method for forming such a structure, including forming a groove in a surface of a substrate, forming a preform having a cooperating portion and a protruding portion, inserting the cooperating portion of the preform into the groove, leaving the protruding portion of the preform protruding beyond the surface of the substrate, applying a layer of a coating material to the surface of the substrate and the protruding portion of the perform, and removing the preform, thereby creating a cooling channel.

9 Claims, 5 Drawing Sheets

(56) References Cited

U.S. PATENT DOCUMENTS

| | | | |
|---|---|---|---|
| 6,528,118 B2 * | 3/2003 | Lee et al. .................. 427/258 |
| 6,551,061 B2 * | 4/2003 | Darolia et al. ............. 416/97 A |
| 6,602,053 B2 | 8/2003 | Subramanian et al. |
| 6,617,003 B1 * | 9/2003 | Lee et al. .................. 428/131 |
| 6,921,014 B2 | 7/2005 | Hasz et al. |
| 2006/0171808 A1 * | 8/2006 | Liang ..................... 416/97 R |
| 2007/0277361 A1 * | 12/2007 | Lee ........................ 29/402.07 |
| 2008/0199661 A1 * | 8/2008 | Keller et al. ............... 428/188 |

* cited by examiner

US 8,815,371 B2

STRUCTURE AND METHOD FOR FORMING DETAILED CHANNELS FOR THIN WALLED COMPONENTS USING THERMAL SPRAYING

This application claims benefit of the 22 Sep. 2008 filing date of U.S. provisional application 61/098,993.

FIELD OF THE INVENTION

This invention relates to methods for manufacturing highly detailed cooling channels near the surface of a coated metal substrate, and more particularly, to methods for manufacturing cooling channels near the surface of gas turbine engine components

BACKGROUND OF THE INVENTION

The combustion temperatures in current gas turbine engines are high enough to melt the alloys used in the "hot path" components, and these temperatures continue to rise as gas turbine engines are further developed. As a consequence, many of the components must be cooled using a gaseous cooling medium passed through complex channels within the "hot path" components. To further protect the hot path components, a thermally insulating protective layer can be used. The temperature gradient over the Thermal Barrier Coating (TBC) is high, reducing the temperature to which the alloys of the hot path components are exposed.

Conventionally, cooling channels have been placed inside the alloy, relatively far from the "hot surface." Improvements have moved the cooling channels closer to the hot surface, and some channels are formed at the interface of the alloy and the thermal barrier coating. This approach leaves more of the alloy on the cool side of the channels than in earlier designs, which ultimately results in increased longevity of the turbine components.

Casting complex cooling channels can be extremely complex and expensive, particularly in large components. Consequently, various methods of manufacturing cooling channels near the surface have been explored and are known in the art. Powder salt has been used to fill grooves on the surface of a substrate casting prior to plasma spraying of metal onto the substrate surface and over the salt filled grooves. However, the form and surface of the channel can be difficult to control using this technique, and salt has been known to migrate out of the groove during the manufacturing process.

Another method, described in U.S. Pat. No. 6,921,014, issued to Hasz et al., includes applying a "stop-off" material to the metal substrate, and then applying a bonding agent. The stop-off material prevents adhesion between the bonding agent and the substrate. Additional layers are subsequently applied to the bonding agent. What results is a substrate bonded to a bonding agent except where the stop-off material was applied, where there remains a gap. This gap can serve as a cooling channel, and the stop-off material may remain or may be removed. As shown by FIG. 3 of U.S. Pat. No. 6,921,014, the form of the resulting channel can be difficult to control, resulting in stress risers.

Yet another method described in U.S. Pat. No. 6,921,014 includes applying a layer to a substrate, where the layer contains a bonding agent together with a "sacrificial material," where various materials can be used as sacrificial materials. Additional layers are then applied. Subsequently, the sacrificial material is removed, leaving a cooling channel between the substrate and the additional layers. Other methods, such as described in U.S. Pat. No. 6,321,449 issued to Zhao et al., include filling grooves in the substrate with pastes or slurry, applying additional layers, and then removing the filler material. These methods typically result in a cooling channel with a four sided cross section, and sharp, 90 degree corners in the cross section.

DETAILED DESCRIPTION OF THE INVENTION

Figure 1:
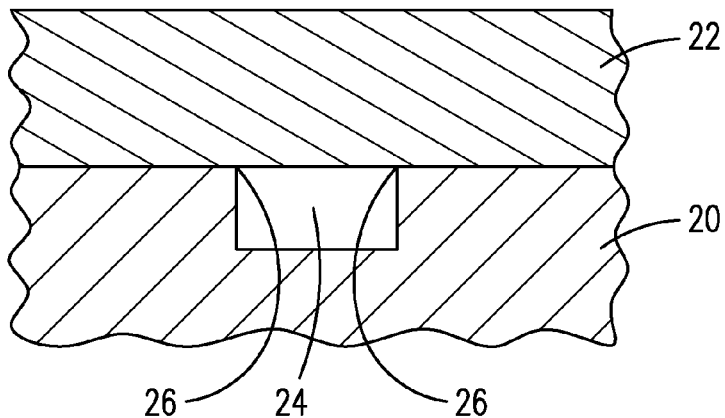
FIG. 1 shows a schematic representation of a cross section of a cooling channel of the prior art in a structure with a substrate and a layer of coating material, where the seam is in a corner of the cooling channel.
Figure 2:
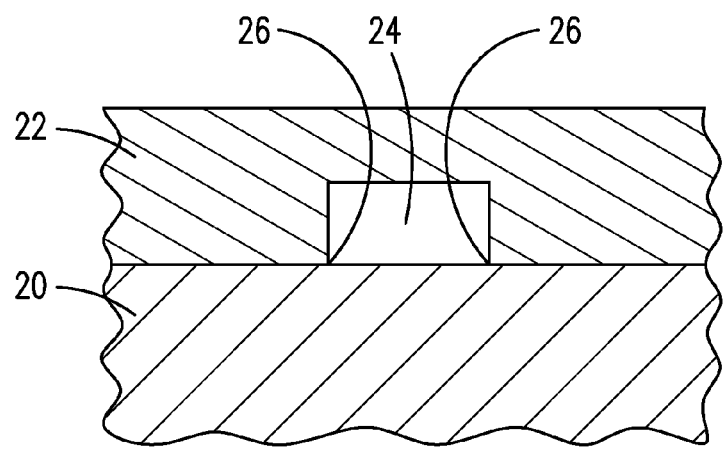
FIG. 2 shows a schematic representation of a cross section of a cooling channel of other prior art in a structure with a substrate and a layer of coating material, where the seam is in a corner of the cooling channel.

The present inventors have recognized that the structures produced using the above described methods result in a configuration where multiple factors combine to increase peak stresses in the cooling channels. A seam, the location where the substrate and coating material meet, is an area of increased stress due to differential thermal expansion of the substrate and layer material. A corner, the intersection of two sides of the cross section of a pressurized channel, is also an area of high stress concentration. The present inventors have recognized that the structures resulting from the above described methods result in a cooling channel with seams that are located in adjacent 90 degree corners that are also corners in which the different materials meet. This can be seen in FIGS. 1 and 2, which schematically show cross sections of cooling channels 24 of the prior art, with a substrate 20, a coating material 22, and seams 26 where the substrate and coating material meet the cooling channel. In both cases the seam 26 lies in the 90 degree corner of the cross section of the cooling channel 24. Such a configuration not only includes a 90 degree corner stress riser, and locates a stress rising seam in a 90 degree corner, but also results in a configuration where the one wall of the cooling chamber that is of the differing material is perpendicular to the other intersecting walls of the chamber. In this configuration the ability of the mechanical forces to separate the two materials at the seam is maximized.

The present inventors have developed a novel structure of detailed cooling channels in a coated metal substrate, and a method for forming the detailed cooling channels near the surface of a coated metal substrate. Grooves are first created in the surface of a substrate, either through the casting process, subsequent machining, or other techniques. These grooves can interconnect and/or form whatever pattern is necessary for appropriate cooling of the component, and thus are not limited to what is shown in the drawings. A premanufactured preform, with a portion that cooperates with the groove, and a portion that extends above the surface of the preform, is then inserted into the groove. One or more layers of a coating material are then applied to the assembly to cover the surface of the substrate and preform. Finally, the premanufactured preform is removed, resulting in a cooling channel within the structure.

This method allows for simpler and thus more economical production, while increasing control of the production process and resulting channels. It allows for greater control of the dimensions of the cooling channels and greater control of the shape of the walls within the cooling channels. Further, it allows for cooling channels with configurations where a wall of differing material is not perpendicular to the walls it intersects, configurations with rounded corners in the cross section, and configurations where corners can be located entirely remote from any corner of the cross section of the cooling channel. Corners are defined as intersecting lines of a cross section of a cooling channel. For example, a cooling channel with a rectangular or square cross section would have four 90 degree corners, and a cooling channel with a hexagonal cross section would have six 60 degree corners etc. Further, the intersecting lines need not be straight, but can instead be the intersection of two curved lines, and the corners themselves can be sharp, or rounded. This method can be used to produce cooling channels in turbine blades, vanes, rings, and segments, as well as combustor cans and transition ducts; however the invention is not limited to such uses.

Figure 3:
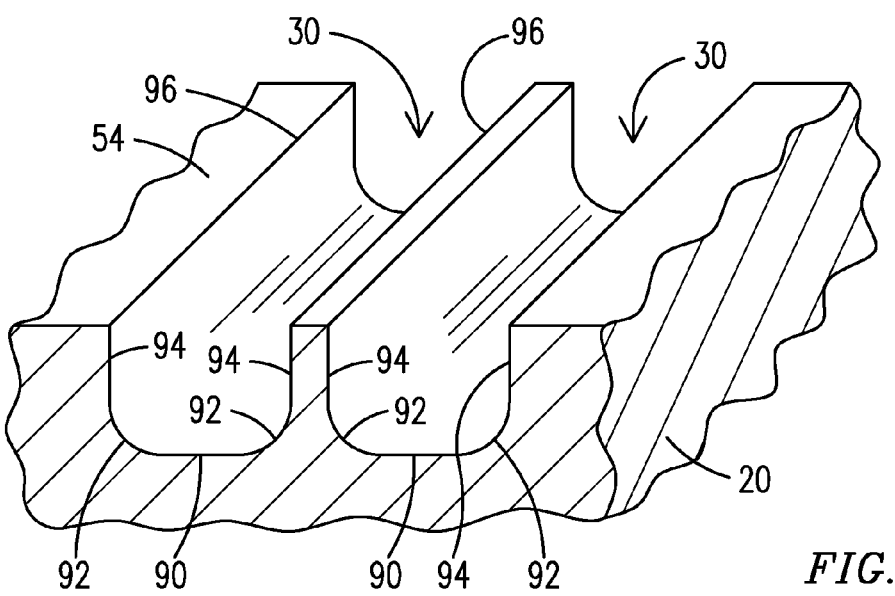
FIG. 3 shows a schematic view of an embodiment of a substrate with grooves that include side walls.

An illustrative embodiment is a configuration where the cross section of the channel forms a rectangular or square shape with rounded corners, and the seam is located away from the corners of the cross section. Such a configuration eliminates the problem of having one side of a channel of differing material being at 90 degrees to the sides of the channel that intersect it, and the associated mechanical disadvantages discussed earlier. It further reduces stress in the corners of the cooling channel by rounding the corners, and by locating the seam away from the corner. As shown in FIG. 3, in this deep groove embodiment the groove 30 in the substrate 20 will contain a bottom area 90, rounded corners 92, and side wall areas 94. The bottom area 90, rounded corners 92, and side-wall areas 94 will be the bottom area, rounded corners, and part of the side-walls of a subsequently formed cooling channel. Surface corners 96 will be part of the seam in the subsequently formed cooling channel where a coating material 22 and the surface 54 of the substrate 20 will meet.

Figure 4:
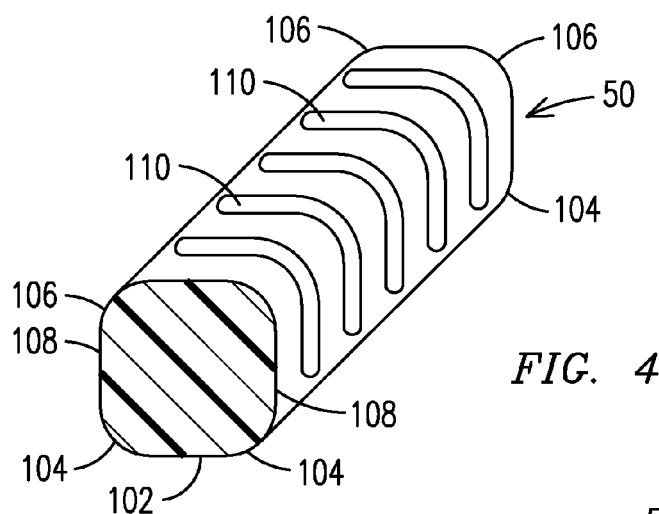
FIG. 4 shows a schematic view of a preform with surfaces formed to create structures on the interior surface of a subsequently formed cooling channel.

A premanufactured preform 50, as depicted in FIG. 4, is placed into the groove. Preform 50 has bottom 102, bottom corners 104, top corners 106, side walls 108, and may have shapes 110 in the surface of the preform. These preforms can be made of the same mold material used for manufacturing cores known to those skilled in the art, or waxes, resins, or polymeric materials such as those traditionally used to shield cooling holes during conventional coating processes, or any other suitable material. The preform can be one a one piece pattern that matches an entire pattern made by the grooves, or it can be made of multiple preforms that together form the pattern made by the grooves. Preforms are placed in the groove(s) such that the bottom 102, bottom corners 104, and side walls 108 of the preform cooperate with the bottom 90, rounded corners 92, and side wall areas 94 of the groove. In this way the preform protects the surface of the groove during manufacturing. In certain embodiments the surface of the preform may be smooth, which will result in a smooth wall in the subsequently formed cooling channel. In other embodiments, such as shown in FIG. 4, the surface of the preform may be formed 110 to create structures in the walls of the subsequent formed cooling channel, such as turbulators and trip-strips. It is preferred that absent a specific need for a sharp corner, any other corners of the preform are also to be rounded.

Figure 5:
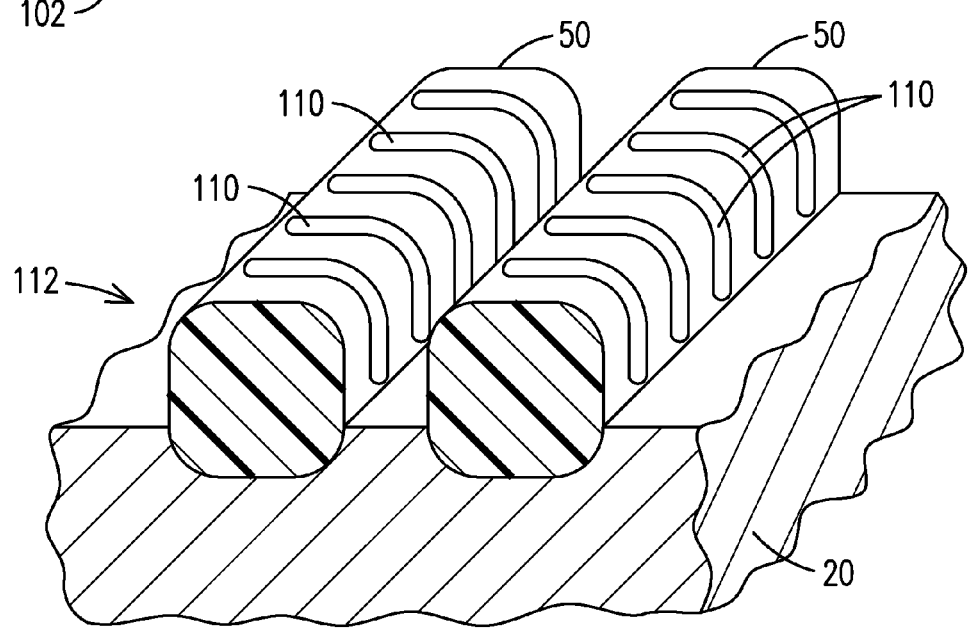
FIG. 5 shows a schematic view of the substrate of FIG. 3, with shallower grooves, with the preform of FIG. 4 in the grooves of the substrate.

As shown in FIG. 5, an embodiment with shallow grooves, once a preform is placed in the groove, a portion 110 of preform 50 remains above the surface 54 of the substrate 20. It is again preferred to avoid creating a seam where the substrate and the first layer material meet such that the seam would be located at a corner or within a radiused corner of the subsequently formed cooling channel. Accordingly, enough of the preform should protrude beyond the surface of the substrate to prevent this from occurring. In embodiments where the grooves 30 in substrate 20 have side wall areas 94, acceptable groove depths place surface corner 96 of substrate 20 anywhere along sidewall 108 of preform 50 that is between the upper rounded corners 106 and lower rounded corners 104. In embodiments where the grooves have no side wall areas, preforms can take any configuration, and preferably any resulting seams where the surface of the substrate and layer material meet in the subsequently formed cooling channel are remote from the corners of the subsequently formed cooling channel.

Figure 6:
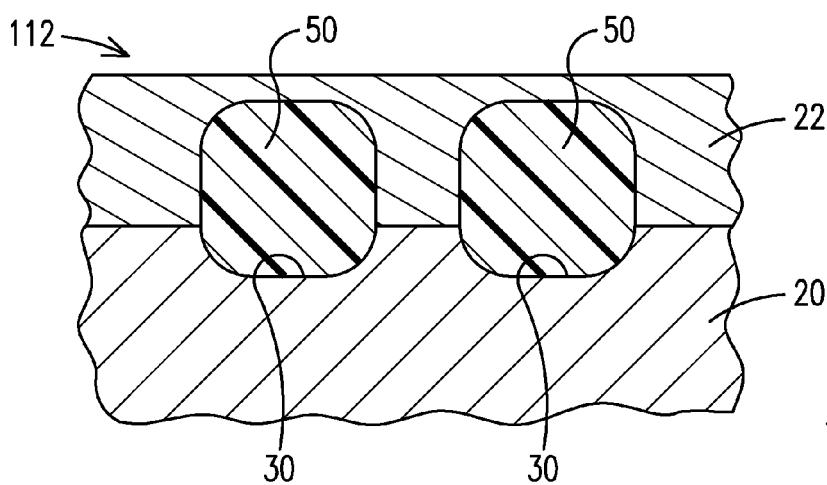
FIG. 6 shows a cross sectional view of the substrate and preforms of FIG. 5 and a first layer of coating material.

FIG. 6 shows the assembly 112 of FIG. 5 with a first layer 22 of coating material applied. The coating material 22 should completely cover the preforms 50 and completely fill all areas between the preforms 50. However, multiple layers of material can be applied, and the cooling channel 30 can extend through as many layers as desired. Any known coating process may be used, such as a process which does not significantly heat the substrate and preform while applying the first layer of coating material. Such a process would allow the use of low temperature materials to be used for the preforms. Acceptable feedstock materials can be in, for example, wire, or powder form. For example, the high velocity oxy-fuel (HVOF) process can be employed to apply the coating material. In this process, a relatively low amount of heat would be transferred to the substrate and preform. Materials to be sprayed over the substrate and preform(s) may be the same alloy as the substrate, or an oxidation resistant material.

In one embodiment, a turbine blade may be made using a substrate made from a superalloy (e.g. Alloy 247), in which the grooves are cast using a standard "stuffer" core fixed into the wax mold of the casting. In this embodiment the preform is also a standard core material used in conventional turbine blade cooling channels. The sprayed layer is an MCrAlY alloy (e.g. Sicoate® 2464 brand coating material). The cores are then removed using the high pressure leaching methods known to those skilled in the art.

In another embodiment, a turbine transition duct may be made of sheet material wherein the grooves are created using electron beam discharge (EDM) machining. The preforms are made from an injection molded polytetrafluoroethene (PTFE) based polymer, and both the substrate and the topcoat(s) are superalloys (e.g. Inconel® 617). Once the layers have been applied, the polymer preforms are removed using the high-temperature bake-out, or diffusion treatment methods known to those skilled in the art.

Figure 7:
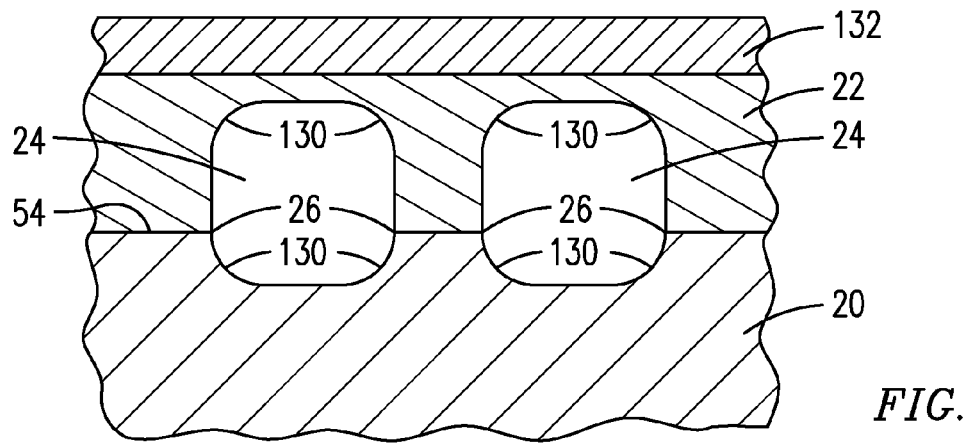
FIG. 7 shows a cross sectional view of an embodiment of the structure including the structure of FIG. 6 with an additional layer of a coating material, and the cooling channels that result when the preforms are removed.
Figure 8:
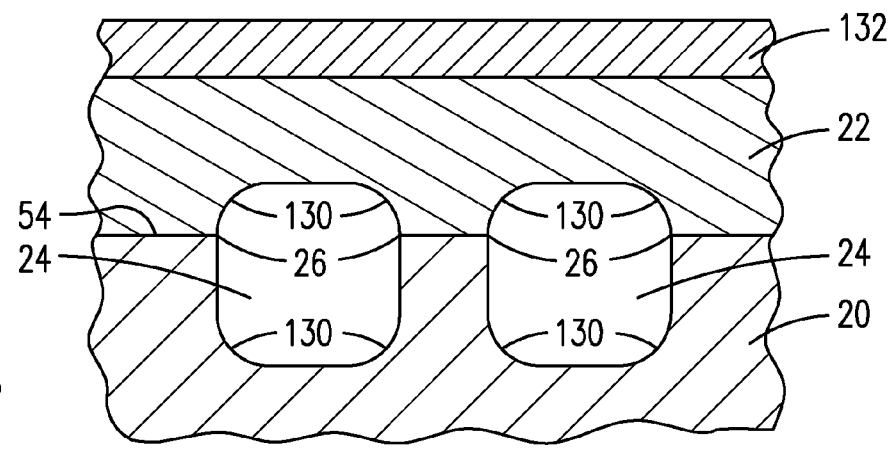
FIG. 8 shows a cross sectional view of another embodiment of the structure of FIG. 7, where the grooves in the substrate are deeper, as in FIG. 3.

FIG. 7 is a cross sectional view of an embodiment of the finished product made of substrate 20 and cooling channels 24, with a first coating layer 22 as shown in FIG. 6, and a second layer 132, where the preforms have been removed according to the method herein, creating cooling channels 24. Seams 26 where the surface of the substrate 54 and the layer material 22 meet are located remote from the radiused corners 130 of the resulting cooling channel 24. Shapes in the wall (not shown) of the subsequently formed cooling channel, such as turbulators or trip-strips, result from the shapes 110 on the preforms 50. FIG. 8 is a cross sectional view of an embodiment of the finished product made of substrate 20 with deep grooves, and with cooling channels 24. Again, seams 26 where the surface of the substrate 54 and the layer material 22 meet are located remote from the radiused corners 130 of the resulting cooling channel 24.

Figure 9:
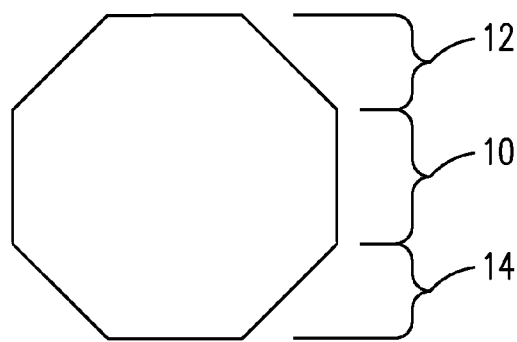
FIG. 9 shows a representation of a cross section of a hexagonal cooling channel.

The invention is not limited to the embodiment presented. FIG. 9 uses a hexagon to represent a hexagonal cross section of a cooling channel, with sharp corners. The hexagon has three regions, 10, 12, and 14, to denote three categories of a myriad of cooling channel shapes where a seam may be located using this method. An example of a cooling channel where the seam is in region 10 is the embodiment presented above. Regions 12 and 14 are discussed below.

Figure 10:
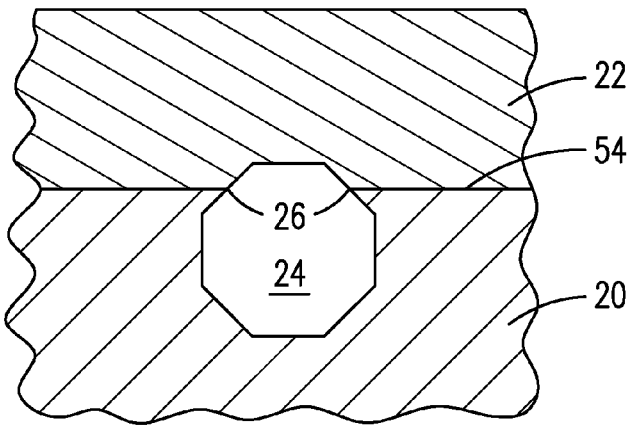
FIG. 10 shows a schematic representation of a cross section of a hexagonal cooling channel in a structure with a substrate and a layer of coating material.
Figure 11:
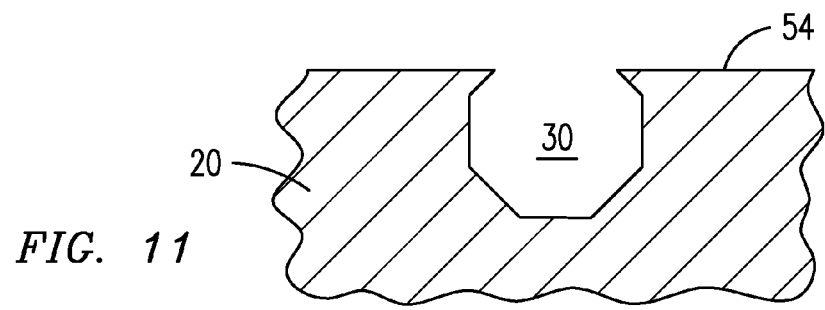
FIG. 11 shows a schematic representation of a cross section of a groove in a substrate that would be required to create the hexagonal cooling channel of FIG. 10.

An example of a cooling channel where the seam is in region 12 can be seen in FIGS. 10 and 11, which shows a configuration with substrate 20, coating layer 22, and cooling channel 24 where the seam 26 is in region 12 of the cross section of the cooling channel 24. Although such a configuration uses a groove 30 with portions wider than the opening of the groove, simply using multiple piece preforms instead of a single piece preform would permit one to use the method of this invention.

Figure 12:
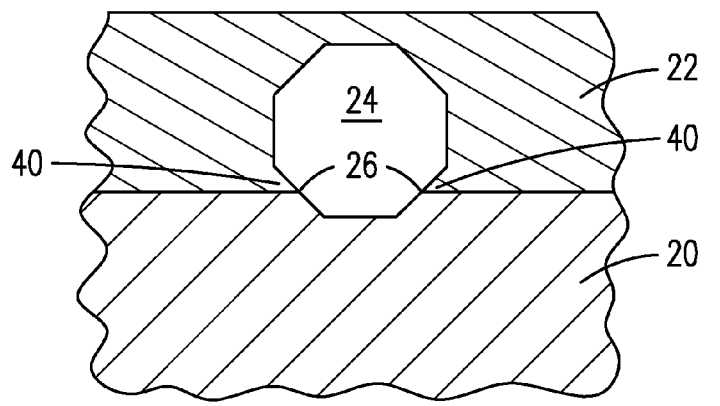
FIG. 12 shows a schematic representation of a cross section another embodiment of a hexagonal cooling channel in a structure with a substrate and a layer of coating material.
Figure 13:
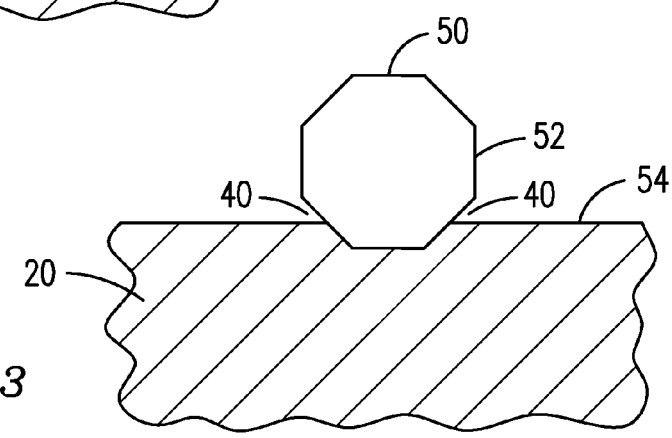
FIG. 13 shows a schematic representation of a cross section of a groove in a substrate and a preform in the groove that would be required to create the hexagonal cooling channel of FIG. 12, and areas where coating material may not reach in configurations like this.

An example of a cooling channel where the seam is in region 14 can be see in FIGS. 12 and 13. Where a protruding portion 52 of the preform 50 also extends over the surface 54 of the substrate 20 and leaves a gap 40 between the surface 54 of the substrate 20 and the protruding portion 52, conventional spraying techniques may not be able to fill gap 40 with layer material. In such instances, however, any other method of applying the coating material known in the art may be used that will not leave such a gap.

Figure 14:
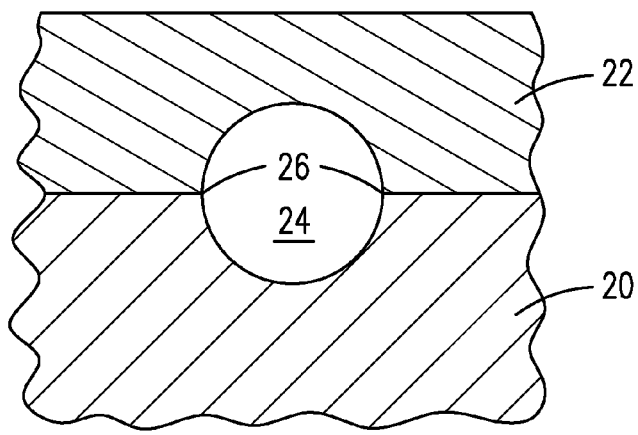
FIG. 14 shows a schematic representation of a cross section of a circular cooling channel in a structure with a substrate and a layer of coating material.
Figure 15:
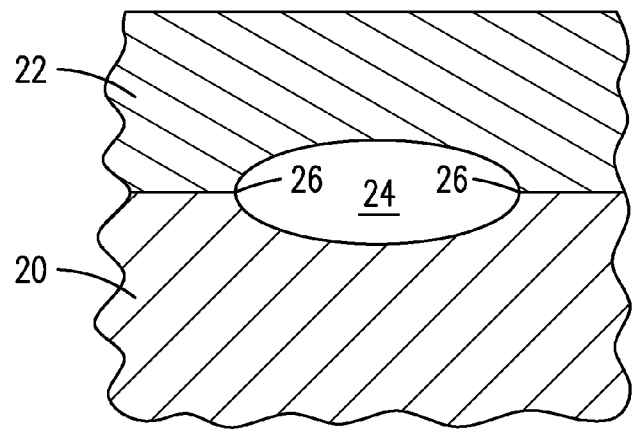
FIG. 15 shows a schematic representation of a cross section of an oval cooling channel in a structure with a substrate and a layer of coating material.
Figure 16:
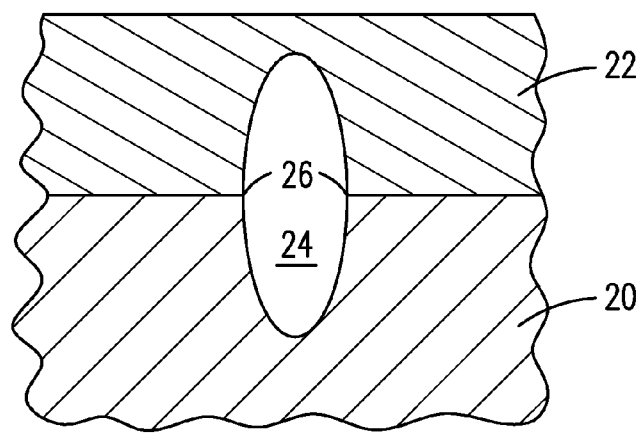
FIG. 16 shows a schematic representation of a cross section of another embodiment of an oval cooling channel in a structure with a substrate and a layer of coating material.

Further, as shown in FIGS. 14-16, for cooling channels without corners, such as circular or oval cross sections, region 10 is a line which substantially bisects the cross section.

Thus, with a simple and economical method of manufacture, this invention results in greater control of the shape of the cooling channels, greater control of the shape of the walls of the cooling channels, and improved strength and reduced peak stress concentration in the walls of the cooling channel. While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A coated substrate comprising:
a substrate comprising a surface, wherein the substrate comprises either cast material or a sheet material;
a coating material coating the surface of the substrate along a seam;
a cooling channel comprising a cross section characterized by at least one corner, wherein the cross section is partially defined by the cast material or the sheet material of the substrate and is partially defined by the layer of coating material, and wherein the seam is disposed remote from all corners present in the cross section of the cooling channel, and
at least one selected from the group consisting of turbulators and trip strips disposed in a wall of the cooling channel that is defined by the coating material.

2. The coated substrate of claim 1, further comprising a preform cooperatively disposed within the cooling channel for preventing the coating material from intruding into the cooling channel.

3. The coated substrate of claim 1, wherein the cast material or the sheet material of the substrate comprises a superalloy.

4. The coated substrate of claim 3, wherein the coating material comprises a bond coat.

5. The coated substrate of claim 1, wherein the turbulators and/or trip strips are formed solely by the layer of coating material.

6. The coated substrate of claim 1, wherein the coating material comprises a plurality of layers, and the cooling channel extends through more than one of the layers.

7. The coated substrate of claim 1, wherein the cooling channel is defined in part by a groove in the cast material or the sheet material of the substrate, wherein in the cross section of the cooling channel the groove forms a gap in the seam, and wherein in the cross section of the cooling channel a width of the groove is larger than a width of the gap.

8. A component for a gas turbine engine comprising:
a superalloy substrate, wherein the substrate consists of either cast material or a sheet material;
a coating material disposed on a surface of the substrate and defining a seam therebetween;
a cooling channel formed in the component and comprising a cross section disposed across the seam; and
at least one selected from the group consisting of turbulators and trip strips disposed in a wall of the cooling channel that is defined by the coating material,
wherein the cross section comprises no corner disposed in a plane of the seam.

9. The component of claim 8, wherein the cross section comprises no 90 degree corner in a plane of the seam.

* * * * *